United States Patent

[11] 3,631,948

| [72] | Inventor | Kazuo Ishikawa<br>Kariya, Japan |
|---|---|---|
| [21] | Appl. No. | 47,677 |
| [22] | Filed | June 19, 1970 |
| [45] | Patented | Jan. 4, 1972 |
| [73] | Assignee | Aisin Seiki Kabushiki Kaisha<br>Kariya-shi, Japan |
| [32] | Priority | June 20, 1969 |
| [33] | | Japan |
| [31] | | 44/48298 |

[54] HYDRAULIC INCHING CONTROL RESPONSIVE TO VEHICLE TILT
7 Claims, 2 Drawing Figs.

[52] U.S. Cl. .................................................. 192/4 C,
192/109 F, 192/13 R, 192/89 W, 180/104
[51] Int. Cl. ..................................................... F16d 67/04,
B60k 29/00
[50] Field of Search ............................................. 192/4 A,
13, 4 C

[56] References Cited
UNITED STATES PATENTS
| 2,474,598 | 6/1949 | Smies ........................... | 192/13 X |
| 2,972,906 | 2/1961 | Schroeder ..................... | 192/4 A X |
| 3,143,127 | 8/1964 | Frost ............................. | 192/4 C X |
| 3,550,734 | 12/1970 | Sinoda .......................... | 192/4 C |

*Primary Examiner*—Benjamin W. Wyche
*Attorney*—Berman, Davidson and Berman

ABSTRACT: A transmission control system for a vehicle having a transmission with fluid-actuated clutch means connected to a torque converter and a hydraulic brake means for arresting movement of the vehicle comprising, a source of pressurized fluid, a first fluid passageway means communicating said pressurized fluid to the clutch means, inching valve means disposed within said first passageway and responsive to operation of the brake means, manual means selectively to regulate the passage of pressurized fluid to the clutch means, a second passageway means interposed between said source of pressurized fluid and said manual means, and means interconnecting said inching valve means with the brake means. The transmission control system further includes normally closed valve means disposed within said second passageway means for interrupting pressurized fluid to flow into said manual means, and sensing means for controlling opening operation of said normally closed valve means responsive to inclination of the vehicle.

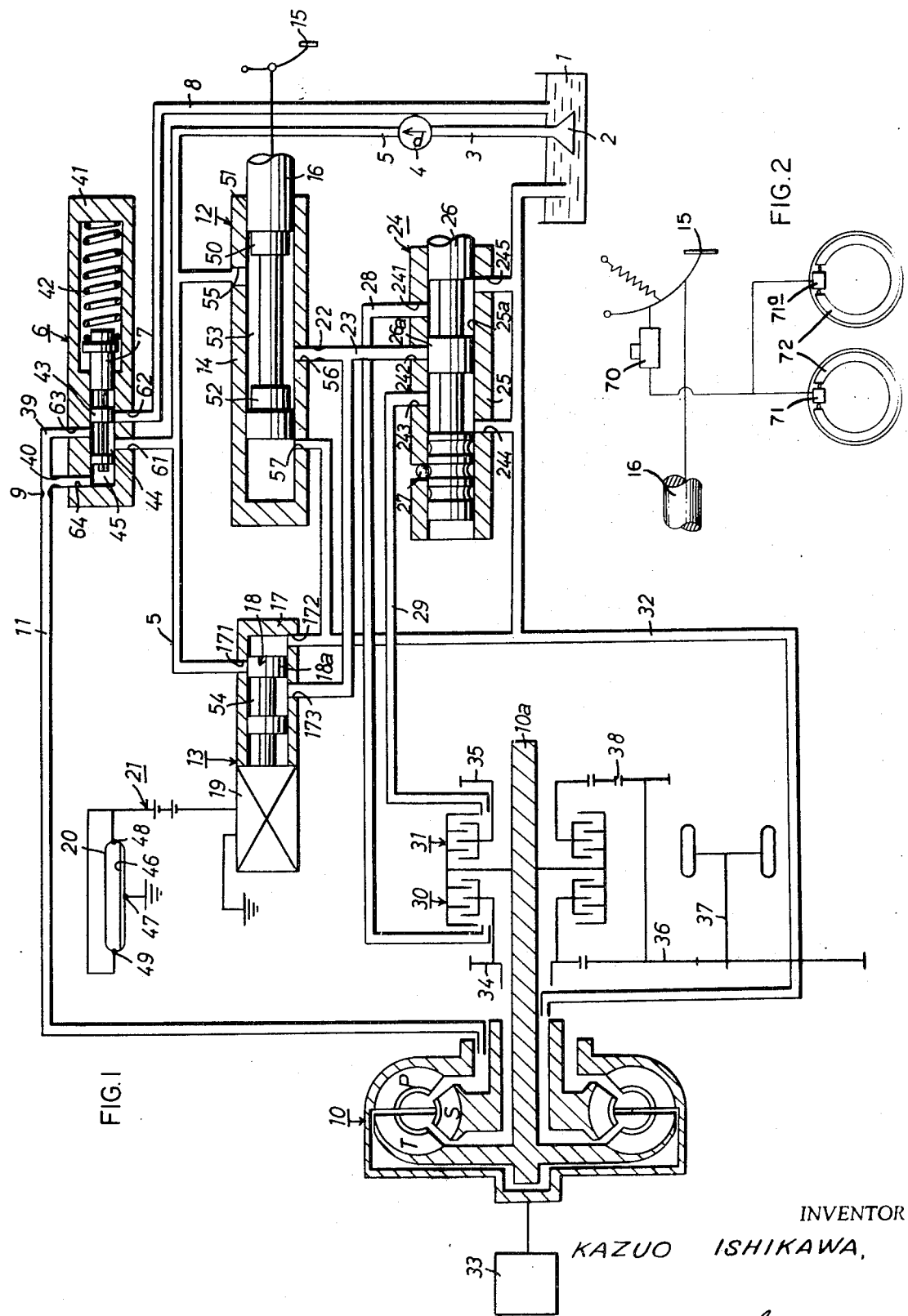

3,631,948

HYDRAULIC INCHING CONTROL RESPONSIVE TO VEHICLE TILT

The present invention relates to a transmission control system, and more particularly to a hydraulic control system for a vehicle provided with fluid-actuated clutch means and a brake system for arresting movement of the vehicle.

An industrial vehicle such as a forklift truck having torque-transmitting means including a torque converter, a transmission having an input shaft driven by the torque converter, a fluid-actuated clutch means is operated with its prime motor in the full or almost full power, and is inched forwardly or backwardly, when loads are being engaged, raised or lowered and deposited. For the easy realization of inching, this type of the vehicle at the full operation of the primitive motor, the vehicle is normally provided with an inching valve means operable in response to actuation of the brake pedal, in other words, with a device to effect loose clutching engagement of the fluid-actuated clutch means.

The conventional inching valve means is designed to actuate loosely the clutch means in the transmission by the idle stroke of the brake pedal, the full brake pedal stroke operating the brake systems. This enables good usage of the vehicle on flat areas, but creates hazards when the vehicle is used on inclined areas such as slopes. Even on inclined areas, the brake pedal must be pressed and released for inching the vehicle to engage, raise, lower and deposit the loads. Thus, as the result of the construction, the clutch means is necessarily actuated and becomes inoperative in accordance with the brake pedal operation. The vehicle, then, moves down the slope by its own weight a longer distance than the operator expects to go from the working area or collides with obstacles.

To avoid the hazards, conventionally, a two-brake-pedal device has been introduced, in which one pedal is employed only to operate the wheel brakes and the other is placed in communication with both of the wheel brakes and the inching valve means. This makes, however, the construction of the control system complicated with two pedals, and the necessity for the operator having to select the pedals is troublesome.

The most important object of the present invention is, therefore, to provide a transmission control system with inching clutch means to inch vehicle by controlling the operation of clutch means within the transmission in response to the operation of the brake pedal of the brake system of the vehicle, said transmission control system of the vehicle, said transmission control system being further provided with control means to render the inching valve means inoperative when a certain degree of inclination of the vehicle is automatically sensed, and to reinstate automatically the effect of the inching valve means as the degree of inclination becomes less then a predetermined value. Thereby, a safe and easy control of the inching of the vehicle is realized even on inclined areas.

A second important object of the present invention is to provide a transmission control system to render safe and easy inching controls of the vehicle on inclined areas by operation of a single brake pedal with the aforenoted control means.

A further important object of the present invention is to provide an hydraulic control system of simple construction and of sharp and sensitive operation for a transmission having a fluid-actuated clutch means, by constructing the control means of said transmission control system with a normally closed valve means placed within a passageway connecting said inching valve means to the clutch means within the transmission and with sensing means to energize said normally closed valve means when an inclined degree of the ground is sensed and deenergize said normally closed valve means as the inclined degree becomes less than a predetermined value.

The novel features that are considered characteristic of the present invention are set forth with particularity in the appended claims.

The invention, itself, however, both as to its construction and its method of operation, together with additional objects and advantages thereof, will best be understood from the following description of the specific embodiment when read in connection with the accompanying drawings, in which:

FIG. 1 is a diagrammatic hydraulic circuit of the control system in accordance with the present invention; and FIG. 2 is a diagrammatic showing of a hydraulic brake circuit used with the control system of FIG. 1.

Referring now to the drawing, a pump 4, FIG. 1, functions to supply the hydraulic control system in this embodiment with pressure fluid which is sucked by the pump 4 from a sump tank 1 through a strainer 2 within the sump tank 1 and a conduit 3, and then, delivered to a control valve means 6 through a conduit 5. The control valve means 6 comprises a housing 41 which has a spool valve 7 engaged reciprocably in the bore formed therein, a coil spring 42 normally biasing the spool valve 7 leftwardly in the drawing, a port 61 connected to the conduit 5, a port 62 connected to a conduit 8 which is in communication with the sump tank 1, and ports 63 and 64 respectively connected to a conduit 11 having an orifice 9 and a conduit 39 having an orifice 40. The control valve means 6 adjusts and keeps by operation of the spool valve 7 fluid pressure at the predetermined value in the conduit 5, and the conduit 11 is connected to a torque converter 10 at one end thereof. An inching valve means 12 has a housing 14 and a spool valve 16 engaged reciprocably in a bore 53 of said housing 14. The spool valve is connected with a brake pedal 15 for link operation, and is provided with spool lands 50, 51 and 52. A port 55 of the inching valve means 12 is connected to the conduit 5. A port 56 of the inching valve means 12 is connected to a conduit 23 having an orifice 22 and leading to a manual control valve means 24. Another port 57 of the inching valve means 12 is connected to a conduit 32 which is in communication with the sump tank 1 at one end thereof. In response to operation of the brake pedal 15, the spool valve 16 is urged to left in FIG. 1 to place the spool lands 50 and 52 to face the ports 55 and 57. Then orifices are formed between the port 55 and the land 50 and also between the port 57 and the land 52, reducing the pressure of the working fluid which is supplied through the conduit 5 and delivered to the conduit 23.

The manual control valve means 24 has a housing 25 in which a bore 25a is formed. Engaged reciprocably in the bore 25a is a spool valve 26 having a land 26a thereon. The valve 26 is connected with a selector lever not shown in the drawing. A ball 27 engaged in the sidewall of the housing 25 is movable into and out of the bore 25a to secure the forward, neutral and backward positions of the spool valve 26. A port 242 of the manual control valve means 24 is connected with a chamber 53 of the inching valve means 12 and a chamber 54 of a normally closed valve means 13 through the conduit 23, and a port 241 is connected through a conduit 28 with the first fluid clutch means 30 to forward the vehicle. A port 243 is connected through a conduit 29 with the second fluid clutch means 31 to reverse the vehicle. Ports 245 and 244 are in communication with the sump tank 1 through the conduit 32.

The normally closed valve means 13 comprises a housing 17, a spool valve 18 with a land 18a engaged reciprocably in the bore within the housing 17 and a solenoid 19 to energize the spool valve 18. Connections are made between a port 171 of the normally closed valve means 13 and the conduit 5, between a port 173 and the port 242 of the manual control valve means 24 through the conduit 23, and between a port 172 and the sump tank 1 through the conduit 32. The solenoid 19 is connected through an electrical circuit 21 with a mercuric switch 20 having contacts 48 and 49 and secured horizontally on a portion of the vehicle body. As the mercuric switch 20 is closed by the forward or backward inclination of the vehicle, the solenoid 19 is energized to urge the spool valve 18 to the right in FIG. 1. When the mercuric switch 20 opens by the return of the vehicle to its horizontal condition the solenoid 19 is deenergized and the spool 18 returns to its original position. Thus, the spool valve 18 prevents normally pressure fluid from getting into the chamber 54 through the conduit 5 by means of the spool land 18a thereon. When the spool valve 18 is urged to the right in FIG. 1 by the solenoid 19 energized by the forward or backward inclination of the vehicle, the chamber 54 opens to the conduit 5 and then, pressurized fluid supplied in the chamber 54 flows into the port 242 of the manual control valve means 24 through the conduit 23.

The torque-transmitting means in this specific embodiment comprises a vehicle prime motor or engine 33, a torque converter 10 interposed between a transmission and an input shaft 10a driven by the torque converter 10, the first fluid clutch means 30 to forward the vehicle interposed between the input shaft 10a and the first forward gear 34, and the second fluid clutch means 31 to reverse the vehicle interposed between the input shaft 10a and the second reverse gear 35. The first gear 34 and the second gear 35 have meshing engagement respectively with the third gear 36 and the fourth idler gear 38 to drive an output shaft 37. The pressure fluid supplied into the torque converter 10 through the control valve means 6 returns to the sump tank 1 through the conduit 32.

In the above-mentioned transmission control system, the fluid in the sump tank 1 runs into the conduit 5 by sucking operation of the pump 4 through the strainer 2 and the conduit 3, flowing into the port 61 of the control valve 6. The pressure fluid further proceeds into he chamber 44 and reaches the chamber 45 through the conduit 39 and the orifice 40. The spool valve 7 within the control valve 6 is pressed to the right in FIG. 1 by fluid pressure from the chambers 44 and 45 and stays in the position where said fluid pressure is offset by the biasing force of the spring 42. At the same time, the port 62 is connected with the sump tank 1 through the conduit 8, thereby, the fluid pressure acting in the conduits 5 and 39 is adjusted to a predetermined value. The adjusted pressure fluid in the conduit 39 is supplied into the torque converter 10 through the conduit 11, the quantity of the fluid reduced by the orifice 9. The adjusted pressure fluid in the conduit 5 flows into the inching valve means 12 and the normally closed valve means 13, the fluid in the inching valve means 12 running in the conduit 23 through the chamber 53. FIG. 2 diagrammatically shows the linkage connections between the brake pedal 15 and the spool valve 16 as well as the master brake cylinder 70. The latter cylinder is connected by pressure fluid conduits to each of the brake cylinders such as 71, 71a for operating the brake 72.

Now, in practical use of the vehicle, the operator of the vehicle presses the brake pedal 15 down and urges the spool valve 26 of the manual control valve means 24 to the left in FIG. 1 by a selector lever not shown in the drawing. Then, the brake pedal 15 is released to permit slow movement of the vehicle which next starts regular running when the accelerator not shown in the drawing is pressed down. When the vehicle reaches a level working area, the brake pedal 15 is pressed down to stop the movement of the vehicle. And the prime motor of the vehicle is actuated up to the full situation, the to raise the lower the loads, meanwhile, the operator holds the brake pedal 15 pressed down and the spool valve 26 remains in the same position. Under the mentioned situation, the land 51 of the spool valve 16 interrupts the flow of pressure fluid from the conduit 5 through the port 55, and the pressure fluid in the chamber 53 returns to the sump tank 1 through the port 57. At this time the brakes 72 stop the vehicle by fluid pressure of the master cylinder 70 and the individual brake cylinders 71, 71a, FIG. 2. To inch the vehicle forwardly, the brake pedal 15 is released slowly or gradually, then the spool valve 16 in the inching valve means 12 moves to a position to have the lands 50 and 52 thereof face respectively to the ports 55 and 57. The pressure fluid from the conduit 5 flows into the chamber 53 through an orifice formed between the port 55 and the land 50, said orifice reducing the quantity of the pressure fluid supplied to the chamber 53. The pressure fluid in the chamber 53 returns to the sump tank 1 through the conduit 32, the quantity of said fluid being reduced by an orifice formed with the port 57 and the land 52. Thus, the pressure fluid supplied from the conduit 5 is delivered to the first fluid clutch means 30 through the bore of the manual control valve 24 and the conduit 28, having the pressure force thereof reduced in the chamber 53 of the inching valve means 12 and furthermore, the quantity thereof reduced by the orifice 22 in the conduit 23. During the above operation, the second fluid clutch means 31 is kept inoperative as the land 26a of the spool valve 26 closes the port 243. The fluid clutch means 30 has gradual clutching engagement and transfers the torque from the input shaft 10a to the output shaft 37 through the first gear 34 and the third gear 36, thereby, the vehicle can be inched forwardly. And an additional pressure onto the brake pedal 15 arrests the movement of the vehicle.

To inch the vehicle rearwardly after the movement of the vehicle is arrested, the following operations should be made; first pull the spool valve 26 of the manual control valve means 24 to the right as in FIG. 1 by the selector lever with the brake pedal 15 pressed down, and then release the brake pedal 15 gradually. This supplies the working pressure fluid reduced by the control action of the inching valve means 12 into the second fluid clutch means 31 through the conduit 23, the port 243 and the conduit 29. The second fluid clutch means 31, then, has gradual clutching engagement and transfers the reverse torque from the input shaft 10a to the output shaft 37 through the second gear 35, the fourth idler gear 38 and the third gear 36, thereby, the vehicle is inched rearwardly. An additional pressure applied onto the brake pedal 15 arrests the movement of the vehicle.

As described above, in the inching movements of the vehicle on level areas, the mercuric switch remains open and the normally closed valve means 13 is kept inoperative, the land 18a of the spool valve 18 of the normally closed valve means 13 preventing access of the pressure fluid from the conduit 5.

The following descriptions should make it very clear how safely and easily the inching of the vehicle can be realized on inclined working areas. The same procedures as to transfer to and arrest the vehicle at the level working area are followed prior to raising and lowering of the loads on the inclined working areas. When the vehicle is slanted to the front side or the back side more than a certain angle, the mercuric switch 20 is closed by the contact 48 or the other contact 49 in the electrical circuit 21. This energizes the solenoid 19 which, in turn, urges the spool valve 18 to the right in FIG. 1. Thus is produced direct communication of the pressure fluid supplied from the conduit 5 with the port 242 of the manual control valve means 24 through the port 171, the chamber 54, the port 173 and the conduit 23. In the inching valve means 12, the port 55 connected to the conduit 5 is closed by the land 51, while the brake pedal 15 remains pressed down. The pressure fluid through the normally closed valve means 13 and the conduit 23 flows, however, freely into the first fluid clutch means 30, effecting full clutching engagement of the fluid clutch means 30. At the same time, the orifice 22 reduces the quantity of the pressure fluid that returns to the sump tank 1 through the ports 56 and 57 of the inching valve means 12 and the conduit 32. Thereby, as the brake pedal 15 is being released slowly and gradually, the vehicle can be inched forwardly safely and easily. The effect of the inching valve means 12 upon the gradual release of the brake pedal 15 is prevented by the pressure fluid supplied through the valve means 13, and the conduit 23. When the vehicle moves to a level area to reduce the inclination thereof below a certain value, the mercuric switch 20 opens and the valve means 13 returns to its original closed condition. This automatically reinstates the effect of the inching valve means 12.

In the case of inching the vehicle rearwardly on an inclined area, the same operation process should be taken as mentioned above except the reverse operation of the manual control valve means 24 is to be performed. Then, by the effect of the valve means 13, the vehicle can rearwardly be inched safely and easily.

As described above, the sensing means 20 works automatically against such slight slants of the vehicle as the operator fails to sense and places the valve means 13 in effect. This provides remarkably safer operation of the vehicle.

In the above-described embodiment of the invention, the sensing means used is a mercury switch which can be replaced by other mechanical devices such as a pendulum, or the like.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. Control apparatus for a vehicle having a transmission with fluid-actuated clutch means connected to a torque converter and hydraulic brake means for arresting movement of the vehicle, comprising a source of pressure fluid including pressurizing means therefor, a first fluid conduit connecting said fluid source to the clutch means and including a return passageway to the fluid source, inching valve means interposed in said first conduit, said inching valve means including manual valve means for selectively controlling the passage of pressure fluid through said first conduit to activate and deactivate the clutch means, means interconnecting the brake means with said inching valve means so that operation of the brake means to arrest the vehicle moves the inching valve means to close said first conduit and prevent access of pressure fluid to said clutch means through the inching valve means, a second conduit connected between said fluid source and said manual valve means to bypass said inching valve means while leaving the manual valve means conditioned for applying fluid pressure to the clutch means when said inching valve means is closed, normally closed valve means disposed in said second conduit for interrupting flow of pressure fluid therethrough to the manual valve means, and sensing means responsive to inclination of the vehicle for controlling the opening of said normally closed valve means, whereby the inching means when the normally closed valve means is opened but automatically reinstated to effectiveness when the normally closed valve means is returned to its closed condition.

2. Control apparatus as set forth in claim 1, wherein said sensing means comprises a switch operative to close upon tilting of the vehicle, and an electrical circuit effective to open said normally closed valve means when said switch is closed, said normally closed valve means returning to closed condition when said switch is opened by return of the vehicle to level condition.

3. Control apparatus as set forth in claim 2, wherein said normally closed valve means comprises a valve having a spool normally closing said second conduit, and a solenoid connected to said spool effective when energized to move the spool to open said second conduit and effective when deenergized to return the spool to its normal closing position, said solenoid being connected to said switch in said electrical circuit.

4. control apparatus as set forth in claim 3, wherein said switch is a mercury switch.

5. Control apparatus as set forth in claim 1, wherein is provided a second clutch means, said first and second clutch means being arranged with associated gearing for respectively forwarding and reversing the vehicle, said manual valve means being effective to selectively control the passage of pressure fluid to said first and second clutch means to as to engage the selected clutch means when fluid pressure is supplied thereto and disengage the same when fluid pressure is removed therefrom, and said sensing means being operative only in response to inclination of the vehicle to permit flow of pressure fluid through said second conduit to said first and second clutch means through said manual valve means.

6. Control apparatus as set forth in claim 5, wherein said inching valve means has a first position for reducing the pressure of fluid in said first conduit and a second position for closing said first conduit, said means interconnecting said inching valve means with the brake means being arranged to prevent the brake means from stopping the vehicle when said inching valve means is in its first position but rendering the brake means effective to stop the vehicle when said inching valve means is in its second position.

7. Control apparatus as set forth in claim 6, wherein there is further provided a regulative valve means connected to said first conduit for adjusting and keeping the pressure of fluid passing therethrough at a predetermined value.

* * * * *

UNITED STATES PATENT OFFICE
CERTIFICATE OF CORRECTION

Patent No. 3,631,948          Dated January 4, 1971

Inventor(s) Kazuo Ishikawa

It is certified that error appears in the above-identified patent and that said Letters Patent are hereby corrected as shown below:

Column 5, line 30, after "inching means" should read -- is rendered ineffective to control the clutch means --.

Signed and sealed this 17th day of October 1972.

(SEAL)
Attest:

EDWARD M. FLETCHER, JR.
Attesting Officer

ROBERT GOTTSCHALK
Commissioner of Patents